Aug. 6, 1957   J. B. GODSHALK ET AL   2,802,182
CURRENT DENSITY RESPONSIVE APPARATUS
Filed Feb. 1, 1954   3 Sheets-Sheet 1

Inventors
James B. Godshalk,
Lewis A. Medlar,
William G. Keck,
By Stone, Boyden & Mack,
ATTORNEYS Aug. 6, 1957  J. B. GODSHALK ET AL  2,802,182
CURRENT DENSITY RESPONSIVE APPARATUS
Filed Feb. 1, 1954  3 Sheets-Sheet 2

INVENTORS
JAMES B. GODSHALK,
LEWIS A. MEDLAR,
WILLIAM G. KECK,
BY Stone, Boyden & Mack
ATTORNEYS

United States Patent Office 2,802,182
Patented Aug. 6, 1957

2,802,182
CURRENT DENSITY RESPONSIVE APPARATUS

James B. Godshalk, West Pikeland Township, Chester County, and Lewis A. Medlar, Oreland, Pa., and William G. Keck, East Lansing, Mich., assignors to Fox Products Company, Philadelphia, Pa., a corporation of Pennsylvania Application February 1, 1954, Serial No. 407,418

13 Claims. (Cl. 324—117)

This invention relates to means responsive to the density of the current flowing through a liquid conducting medium, and more particularly, for measuring the current density at any desired point in such a medium.

While the invention is especially applicable to galvanic baths, such as are utilized in electro-plating, electro-cleaning, electro-stripping and electro-polishing, it is not limited to use with electrolytes of this nature, but may be advantageously employed in measuring the current flowing through any liquid conducting medium, as, for example, in the treatment of liquids with an electric current for producing physical or chemical changes. The invention is also usable for measurement of corrosion currents attacking the plates of a ship or corrosion currents attacking a metal pipe buried in the earth. Consequently, the term "liquid conducting medium" will be understood to cover any medium containing liquid which allows conduction through the medium of an electric current. The medium may be earth and merely contain sufficient liquid to conduct current.

The present application is a continuation-in-part of our prior co-pending application, S. N. 252,742, filed October 23, 1951, now abandoned, which, in turn, was a continuation-in-part of our prior application S. N. 231,352, filed June 13, 1951. This latter application, now abandoned, was a continuation-in-part of our prior application S. N. 60,932, filed November 19, 1948, now abandoned.

Many attempts have been made to design an apparatus for measuring the density of current flowing in a galvanic plating bath, since the density of the current adjacent any portion of the object being plated is proportional to the amount of plating material being deposited on that portion. It is of course well known that the thickness of plating material on the object, and hence the density of plating current varies widely over the length of the object, depending on the configuration of the object.

An apparatus previously proposed for measuring current density consists of a pair of plates separated by an insulator, with the two plates being connected to opposite sides of a meter. However, polarizing voltages at the surfaces of the plate and the shielding effect of the plate on the current flowing to the object being plated, together with the distortion of the field of current caused by immersion of the plates in the liquid, cause errors of such magnitude that the measurements obtained with such proposed apparatus have been found to be so inaccurate as to be substantially unusable.

The present invention is intended to avoid all the errors introduced by the apparatus previously proposed and to provide an apparatus which yields accurate measurements of the density of current at any location between the electrodes to which the plating voltage is supplied.

An object of the invention is to provide a device for measuring the density of flow of such a current by means of the effect produced thereby on a coil wound on a magnetic core of high permeability immersed in the liquid bath.

Another object is to provide a simple, portable, self-contained device of this character, which, when immersed in a liquid bath, will at once indicate the density of the current flowing through the bath at the point where the device is located.

A still further object of the invention is to devise a means for measuring current density which does not draw away or divert any substantial portion of the current flowing through the bath, and which does not appreciably affect the distribution or pattern of current flow.

The apparatus of the present invention includes a magnetic core of high permeability substantially defining a closed path which encloses a cross-sectional area which is small in comparison with the total cross-sectional area of the bath through which current flows. The apparatus further includes a coil wound on the core, and a detecting circuit connected to the coil.

Applicants do not claim to be the first inventors of the broad combination of a magnetic core with a coil wound thereon and a detecting circuit connected to the coil. As a matter of fact, this general combination was disclosed on April 24, 1920 in an article in the Swiss Physical Society Archives des Sciences Physiques et Naturelles, series 5, vol. 2, pages 264 and 265. However, there is no disclosure in this reference that such an arrangement could be used for measurement of the density of current flowing through a liquid-conducting medium. The apparatus of the reference further included a second core having a coil thereon to which an alternating electric current was supplied. The two coils were mounted within a bath, and the whole combination was used to measure the "resistance" or conductivity of the liquid.

There is no suggestion in the reference that a magnetic core and coil wound thereon would be responsive only to current flowing through the cross-sectional area enclosed by the core so that this current could be detected to the exclusion of current not flowing through that cross-sectional area. As a matter of fact, Relis Patent 2,542,057, issued February 20, 1951, points out that the two cores of the arrangement disclosed in the Swiss article must be placed together co-axially, so that all the current caused to flow through the liquid by the current flowing in the first coil links the second core, and the voltage supplied to the first coil must be maintained constant in order that an accurate measure of conductivity can be obtained.

In contrast, applicants' discovery that a magnetic core and coil wound thereon suspended in a bath of conducting liquid having current flowing therethrough in a large cross-sectional area are responsive only to the portion of that current which passes through the cross-sectional area defined by the core, permits the apparatus of this invention to operate for the purpose for which it is designed. Moreover, during plating operations it is frequently necessary to vary the voltage supplied to the electrodes over rather wide limits, thus varying the plating current through the bath. Applicants' apparatus must and will operate to provide a correct indication of current density, despite such variations in applied voltage. The theoretical basis of this discovery which permits applicants' apparatus to operate for the purpose for which it is designed will now be discussed in part.

Ampere's law states that the line integral of the magnetic field intensity around a closed path is equal to the current enclosed by that path. Considering our magnetic core to be that closed path, we find that the line integral of the magnetic field intensity around the core is responsive only to the currents enclosed by the core. The magnetic field intensity around the core determines the degree of saturation of the core, as clearly shown in the well-known hysteresis curves for iron cores.

This effect of the current flowing through the core on the saturability of the core is employed in the apparatus disclosed in co-pending application S. N. 260,369, filed December 7, 1951 by Gerard Rezek, and assigned to the assignee of the present invention. The magnetic core forming part of the apparatus disclosed in that application is readily saturable at a low level of magnetic field intensity. When the core is immersed in a bath of liquid having no current flowing therein, the permeability of the core has one value. When current is flowing through the liquid, the current flowing through the cross-sectional area enclosed by the core produces a magnetic field having an intensity around the core such that the core is saturated. The permeability of the core is thus reduced. From the above reasoning, we know that this reduction of permeability is determined only by the current flowing through the cross-sectional area enclosed by the core. The application referred to discloses apparatus to detect this change in permeability.

The present application might be said to be generic to the invention disclosed in the Rezek application, because the present application discloses and claims an invention which is basic to the apparatus disclosed and claimed by Rezek. This basic invention includes the provision of a magnetic core which is immersed in a liquid conducting medium and has such dimensions in comparison with the total cross-sectional area of the medium which carries current that a portion of the current flowing through the medium passes through the cross-sectional area enclosed by the core, while another portion of the current flows only outside the core. This basic invention also includes a coil wound on the core, and a detecting circuit connected to the coil.

The specific apparatus disclosed and claimed by Rezek is capable of measuring the density of a pure direct current, as well as of a direct current having a harmonic component. However, the Rezek invention is actually a further development of the invention disclosed in this application, so that this application covers the measurement of the density of a pure direct current, as well as a direct current having a harmonic component.

In order that the present invention may be readily understood, reference is had to the accompanying drawings forming part of this specification, which discloses specific embodiments of the present invention.

Figure 1:
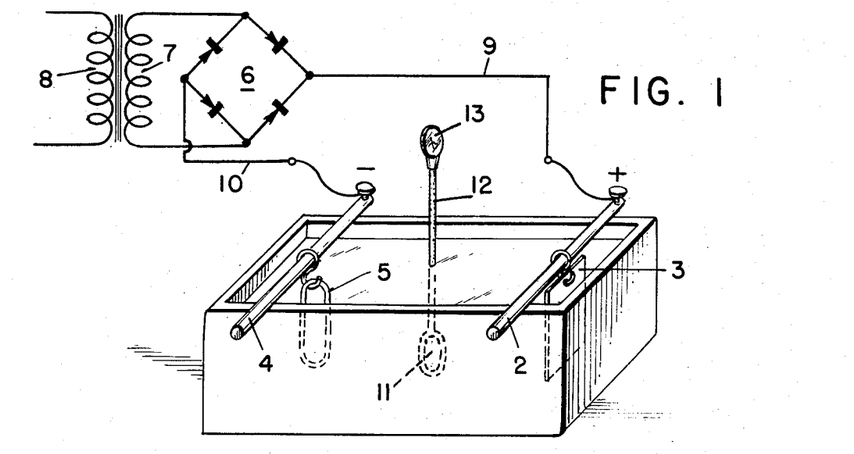
Fig. 1 is a schematic view illustrating a conventional electro-plating arrangement, showing our invention as applied thereto.

Referring to the drawings in detail, 1 designates a conventional vat containing an electrolyte and having adjacent its ends supporting rods 2 and 4 from which are suspended the anode 3 and cathode 5. Usually the anode will be a plate of some suitable metal, while the cathode will consist of the article to be plated.

It has recently been the usual practice to supply current of this nature from a rectifier such as 6 connected to the secondary 7 of a transformer, the primary 8 of which is supplied with alternating current. Direct current is supplied to the plating electrodes from the rectifier 6 by means of conductors 9 and 10, the former being connected with the anode rod 2 and the latter with the cathode rod 4.

The direct current flowing through the bath as a result of the voltage supplied thereto by rectifier 6 actually is a unidirectional, pulsating current, composed of a D.-C. and an A.-C. component. The apparatus of our invention disclosed specifically in this application is responsive to the A.-C. component of the total or resultant current, though it will be obvious from the above discussion that the invention includes the measurement of a pure D.-C. current not having any A.-C. component. Due to the periodically varying or pulsating nature of the A.-C. component of the current flowing in the bath, the electromagnetic field generated thereby fluctuates rapidly, and hence an alternating voltage will be induced in any conductor located within this field.

Our improved current density measuring device may comprise a helical coil 15 of insulated wire formed into a loop. Such a coil will in itself respond to the flux variations generated by the pulsating current flowing in the bath through the area enclosed by the loop, but to greatly increase its response we prefer to wind it on a ring-like core 14 of material of high magnetic permeability, such as soft iron, which core serves to amplify the strength of the flux. As a matter of fact, we have found it extremley important to the selective character of this coil, which allows it to discriminate between current flowing outside the loop and current flowing therethrough, that the high permeability core be used.

Figures 2, 3, 4:
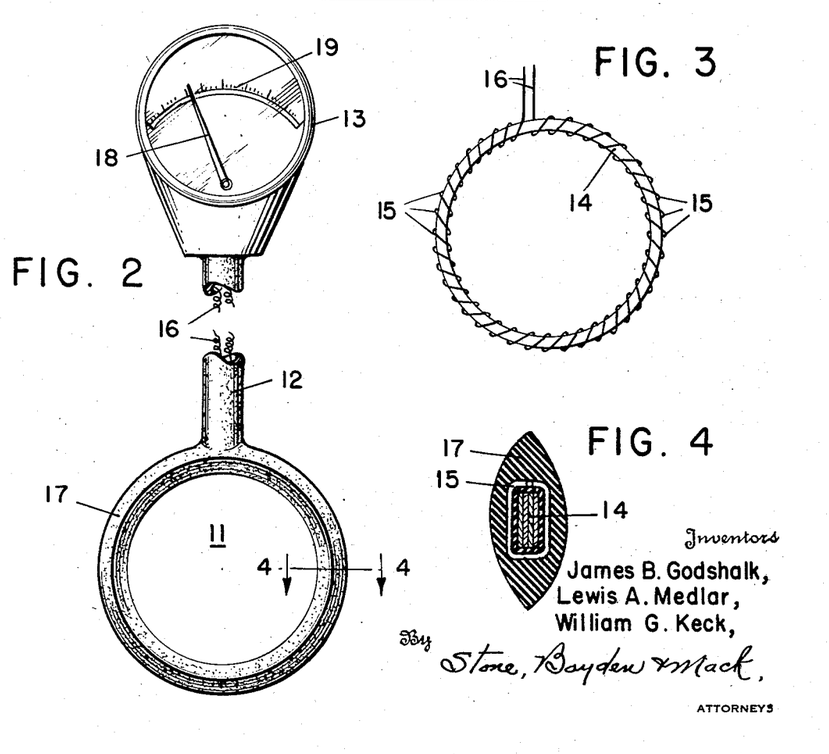
Fig. 2 is a view in elevation and on an enlarged scale illustrating one form of our improved current density measuring device, parts being broken away.
Fig. 3 is a diagrammatic view showing the coil embodied in the device illustrated in Fig. 2.
Fig. 4 is a transverse section on an enlarged scale substantially on the line 4—4 of Fig. 2, looking in the direction of the arrows.

In order to reduce any eddy currents, the core 14 is preferably laminated, as shown in Fig. 4.

In order to protect the coil and core from the effect of corrosive liquids, they are preferably enclosed or encased in an annular shield or casing 17 of rubber or suitable plastic material.

Fig. 2 illustrates one embodiment of the completed instrument. The helical coil in the form of an annulus, and its protecting casing, are designated in their entirety by the numeral 11, and hereafter referred to as a toroid, and rigidly connected with the casing is a hollow handle to which extend insulated wires 16 connected with the ends of the coil 15.

These wires are in turn connected with the terminals of a suitable indicating instrument in the nature of an ammeter or galvanometer. This of course may be supported in any suitable way, but as shown in Fig. 2, is conveniently carried by the upper end of the hollow handle 12. This instrument is designated in its entirety by the numeral 13 and is shown as provided with a pointer 18 moving over a suitable scale 19.

In use, our improved device is immersed in the conducting liquid through which current is flowing, at any point where the current density measurement is desired, and is preferably so positioned that the plane of the toroid 11 lies substantially at right angles to the direction of current flow through the liquid bath. By reference to Figs. 3 and 4 it will be seen that, in the embodiment illustrated in these figures, the convolutions of the coil 15 lie substantially in radial planes, that is to say, planes passing through the axis of the annulus. While the core or ring may be round or square in cross-section, it is preferably relatively wide and thin, and when so constructed each convolution of wire comprises two relatively long side portions and two relatively short end portions. The relatively long side portions of the convolutions thus extend substantially parallel to the direction of current flow when the loop or annulus is positioned with its plane at right angles to the direction of current flow, as above described.

It will thus be seen that, in this preferred form, a structure is provided which offers minimum obstruction to current flow in the bath, but effects maximum induction of voltage in winding 15.

It will be obvious with this arrangement of the toroid that one portion of the current flowing in the bath will pass through the cross-sectional area enclosed by the core, and another, and larger, portion of the current will flow only outside that cross-sectional area, though in substantially the same direction as said one portion of the current. It will be shown hereinafter that a voltage will be induced in the coil which is responsive to, and substantially only a measure of, the current flowing through the core.

If the toroid is immersed in the bath, with its plane at right angles to the direction of current flow, it encloses a cylindrical body of liquid, the diameter of the cylinder being the inside diameter of the toroid. This cylindrical body of liquid can be considered as a single turn conductor and it will thus be understood that periodically varying current flowing through this conductor sets up a fluctuating electro-magnetic field surrounding the conductor. The core 14, in the form of a loop, being of material of high permeability, may be said to intensify the lines of force of this field, and such lines of force in this core are "linked" with the turns of winding 15 and with the single turn of the bath current flowing through the cylinder. Since the electro-magnetic field is of a fluctuating nature, an alternating voltage is induced thereby in the winding 15.

Another way of explaining the operation of the coil is to say that where, as is preferred, a core of magnetic material is employed, the current in the bath flowing through the area enclosed by the core generates a pulsating flux in the core, and this pulsating flux induces an alternating voltage in the coil wound on such core. It will be particularly noted that, in the preferred form, the winding 15 surrounds the core 14 throughout substantially the entire circumference of the latter, as shown in Fig. 3, and that the convolutions of this winding are closely and uniformly spaced on the core. This arrangement constitutes what we designate a "true toroidal coil" and is desirable to produce the most accurate results.

The amount of voltage induced in winding 15 depends upon the number of lines of force effectively linked with the turns of the winding, or, in other words, upon the magnitude of the flux in the core. While current flows through the entire mass of liquid in the vat, as well as through the cross-sectional area enclosed by the toroid, it will now be shown that the magnetic lines of force which flow through the liquid outside of the toroid do not generate any substantial voltage in the coil 15.

We have a magnetic core of high permeability having a coil wound thereon and immersed in a liquid conducting medium in such fashion that a portion of the currents flowing through the medium passes through the cross-sectional area enclosed by the core, and another portion of the current flows only outside of that cross-sectional area. Since we are only interested in measuring direct current, the current flowing only outside the core flows in substantially the same direction as the current flowing through the core. The voltage induced in one turn of the coil is equal to the differential of the flux density with respect to time of the flux linking that turn.

Now, consider the current flowing through the liquid conducting medium as being composed of an infinite number of conductors each carrying a current I. The density of flux linking one turn of the coil caused by the current flowing in one conductor at a distance R from the turn $$B = \frac{uI}{2\pi R}$$

where $u$ is the permeability of the path through which the linking flux passes. This is a simplification of the Biot-Savart law which is accurate when the conductor is sufficiently long that the distance from the turn to the conductor is small in comparison with the length of the conductor.

Since the varying component of the direct current changes in a harmonic fashion, the voltage across this one turn of the coil $$E = \frac{kuI}{2\pi R}$$

where $k$ is a constant of differentiation.

The voltage across this one turn of the coil due to the current flowing in one conductor at a distance R from the turn $$E = C \frac{uI}{R}$$

where C is another constant including $k$ and $2\pi$.

To obtain the total voltage across this one turn, due to the current flowing through all of the assumed conductors carrying current, we need only add together the voltage produced by linking flux from each conductor. Considering one flux path as that defined by the core, we know from Ampere's law that the magnetic field intensity, and hence the flux density, around this path is due only to the current flowing through the area enclosed by the path. This path has a very high permeability because it is defined by the magnetic core. Consequently, the voltage induced in the turn due to linking flux in this path, is relatively high. Next, consider all the other flux paths which link the turn. These paths will link all the current flowing outside the area enclosed by the core. The permeability of each of these paths is relatively low, because only a relatively small portion of the path is formed by the magnetic core, and the permeability of the liquid conducting medium is extremely small in comparison with the permeability of the core. Consequently, the voltage induced in the turn due to flux following other flux paths not defined by the core is extremely small in comparison with the voltage induced in the turn due to the flux following the path defined by the core.

Since the voltage induced in the total turns of the coil is merely equal to the sum of the voltages induced in each turn, the voltage across the coil due to current flowing only outside the cross-sectional area enclosed by the core is extremely small in comparison with the voltage across the coil due to currents flowing through the cross-sectional area enclosed by the core. As a matter of fact, it has been found that the voltage caused by current flowing through the core is so large in comparison with that caused by currents flowing only outside the core that the latter may be neglected, and the voltage induced across the coil is a very good measure of the varying component of the current flowing through the core. It will be later shown that the varying component of the current and the D. C. component thereof bear, or can be made to bear, a known proportionality to each other. The voltage across the coil is then a measure of the magnitude of the current flowing through the core, and, since the cross-sectional area enclosed by the core is known, the voltage across the coil is a measure of the density of the current through the core.

The above discussion covers any coil wound on the core, whether the coil is lumped or distributed. However, applicants have found that a coil which is substantially of true toroid form, that is, a coil wound helically around the entire length of the cylindrical core with adjacent turns being as close together as possible, provides a more accurate result than does a lumped or concentrated coil. This can be understood from the following.

The voltage across the toroid $$V = \int_0^{2\pi} K \cdot B \cdot A \cdot f \cdot \frac{N}{2\pi} \cdot \sin \alpha \, d\alpha$$

where $k$ is a constant, A is the cross-sectional area of a turn of the coil, $f$ is the frequency of the flux variation, N is the number of turns of the coil, and B is the flux density of the flux linking the toroid.

Now, consider the flux linking the toroid as being uniform in intensity and direction over the area of the toroid.

$$V = C \int_0^{2\pi} \sin \alpha \, d\alpha$$

Where C is a constant including all the constant terms of the equation.

$$V = C\left|-\cos\alpha\right|_0^{2\pi} = 0$$

In other words, the voltage across the toroid due to a magnetic field having a flux density uniform in intensity and direction over the area of the toroid is zero. But the flux density due to current flowing through the area enclosed by the core and the flux density due to currents flowing outside the core but close thereto are not uniform, so that these currents cause a voltage to be induced in the toroid. However, currents flowing a substantial distance from the core produce magnetic fields which are substantially uniform around the area of the toroid and hence induce no substantial voltage in the toroid.

Moreover, any voltage induced by reason of a uniform magnetic field caused by currents flowing outside the toroid is cancelled by an equal voltage induced in the opposite direction in turns of the coil at the diametrically opposite point of the toroid, assuming that the current density in the bath is uniformly distributed about an axis coincident with the axis of the ring and of the direction of current flow. Such generation of voltage in opposite directions in turns of the coil in opposite points of the toroid is due to the fact that the magnetic lines of force set up by the outside current pass across all parts of the toroid in the same direction in space. Therefore, because the diametrically opposed turns of the coil are displaced 180° relative to each other, such turns are oppositely linked by the magnetic lines of force produced by any current flowing in the bath outside of the toroid. Thus voltages generated thereby buck each other. But if, as is usually the case in actual practice, the current distribution in the bath is not uniform, or if there is an external magnetic field or flux coming from some other source disposed at varying distances from different parts of the ring, the foregoing statement in regard to the voltages induced in diametrically opposed turns cancelling each other would, of course, not be true. However, in the case of uniform external magnetic fields emanating from any source whatever, it has been shown above that the sum of all the voltages induced thereby in all of the turns of the coil is 0, provided the coil is a perfect toroidal one, and provided also that the permeability of the core material is constant. But these are conditions never completely fulfilled in practice. It is impossible to produce a winding which is a mathematically perfect toroidal coil, and even the most carefully constructed coil is therefore slightly inaccurate. Moreover, all materials having high magnetic permeabilities exhibit the phenomena of permeability varying with the intensity of the magnetic field. Hence a coil wound on a ring of such material would inherently be somewhat sensitive to external fields, thus again giving rise to a slight error. Not withstanding these theoretical inaccuracies, the error is actually insignificant or negligible, and, for all practical purposes, it is only the current flowing through the body of liquid inside the toroid which is effective in inducing voltages which are cumulative in all of the turns. As above stated, diametrically opposed turns are displaced at 180° relative to each other, and the lines of force from any elemental current inside the toroid thread the turns on opposite sides in opposite directions. Thus, all magnetic lines of force produced by the total current flowing inside the toroid must thread the turns of the coil at all points in the same relative direction. Hence the amount of voltage induced in the coil will be directly proportional to the amount of the periodically varying current flowing through the cross-sectional area of the liquid conductor enclosed within the toroid. Since the area within the toroid is constant and known, the value of the voltage induced in winding 15 obviously is a simple function of the current density in the bath or liquid at the point of location of the toroid.

In use, since the strength of the induced current is relatively small, it may be desirable to amplify this current before applying it to a meter or other current responsive device. But, as long as the amplification factor is known, the resulting current can still be said to be a simple function of the density of the current flowing through the conducting liquid.

The indicating instrument or meter 13 may be calibrated to read directly in terms of current density, that is to say, the amount of current per unit of cross-sectional area, such, for example, as amperes per square foot. The instrument may be in the nature of a recorder, as well as an indicator.

While we have stated that it is preferable to immerse the coil in the bath in such position that it lies in a plane at substantially right angles to the direction of current flow, it is not essential that the coil be placed in this position. All that is necessary is that it be placed in such angular position that a part of the current flowing in the bath passes through the opening of the coil and core. When the coil and core are placed at right angles to the direction of current flow, the entire area enclosed is the effective area used in determining the current density in the bath. If, however, the coil is so placed that its plane lies at some angle less than at a right angle to the direction of current flow, then the effective area is the projection of the actual area on a plane lying at right angles to the direction of current flow, and this projected, effective area is proportional to the cosine of the angle which the coil makes with a plane lying at right angles to the direction of current flow. Thus the effective area may be readily computed, or a meter calibrated, for any given angular position of the coil. When the coil is set at some angle less than a right angle to the direction of current flow, as above described, the liquid conductor enclosed within the toroid, instead of being a "cylindrical body" as previously referred to, will be of more or less elliptical cross-section, but the same principle will apply.

Also, under these circumstances, the convolutions of the coil will no longer lie in planes which are parallel with the direction of current flow, as described in connection with the preferred form, but they still will be linked by the lines of force due to the current flowing through the opening of the coil, and voltage will therefore still be induced in them, although for the same current density in the bath, the induced voltage will not be of as great magnitude as in the preferred arrangement. In other words, a pulsating flux will be still set up in the looped core by the periodic current flowing in the bath through the effective area enclosed by said core.

By means of our improved device the density of current flow through any part of the bath may be explored as desired, so as to determine whether or not the current density at any given point is of the proper magnitude to produce the desired result.

While, for measuring the density of current flowing horizontally through a bath, as in Fig. 1, the handle 12 would be straight, and lie in the plane of the toroid, as shown, if it is desired to measure the density of current flowing in a vertical direction, the handle would be disposed so as to extend, at least in part, at right angles to the plane of the toroid. Or, the handle may be made of flexible tubing, so that it can be bent if necessary, to meet special conditions. In place of the ammeter, for simply indicating the current density per unit of area as above described, we may employ a voltage or current responsive device, which, through any suitable means may operate to automatically control the amount of power supplied to the bath, so that the desired current density may be maintained. In the appended claims we have therefore used the term "detecting circuit," this term being intended to include any sort of indicating or recording meter, amplifier, relay, alarm, motor control device, or any other instrumentality operated by the voltage generated in the winding of the toroid.

It is well known that the output of a full wave rectifier, such as shown at 6 in Fig. 1, is not a pure D.-C. voltage but rather is a pulsating voltage which may be analyzed into a D.-C. and a harmonic or A.-C. component. Analysis of the Fourier series for such a rectifier shows that the A.-C. component consists of one component having a frequency twice that of the voltage supplied to the rectifier, a second component of four times the frequency of the supply voltage, etc. The effective value of these lumped components may be indicated by the ordinary A.-C. voltmeter and is actually the root mean square of the various components. The ratio of that effective value to the magnitude of the D.-C. component is a well known criterion called the ripple factor. As shown in Table I on page 265 of "Applied Electronics," E. E. Staff of M. I. T., John Wiley & Sons, Inc., 1943, the ripple factor for a full wave rectifier is 0.48. This is a known constant value, so that the A.-C. and D.-C. components of the applied voltage have a predetermined, known proportionality to each other.

We are interested, however, in the proportionality between the A.-C. and D.-C. components of the current flowing through the bath. Since this bath is substantially purely resistive, one would expect the two components of the current to have the same proportionality as the corresponding components of the applied voltage. As a general rule this is true, but with certain types of baths, back voltages are generated in the bath during the flow of plating current. These back voltages tend to change the proportionality between the components of the current, but for any bath the proportionality between the A.-C. and D.-C. components can readily be determined. It is also possible that the proportionality between the A.-C. and D.-C. components will differ in certain types of baths with change in the applied voltage. However, the proportionality between these components for any level of applied voltage can be determined, and, if necessary, the value of A.-C. voltage detected by the meter can be read directly and translated into the equivalent value of D.-C. voltage in accordance with the pre-determined known proportionality between the components. It is also possible that the change in proportionality be compensated for by change in the calibration of the meter or other current responsive apparatus.

While we have illustrated and described carrying out our improved method by means of a periodically varying or pulsating current supplied from a rectifier, it is possible to produce the result in other ways. Thus, for example, the commutator ripple of a direct current generator may supply the necessary pulsating component. Also an interrupter or similar device could be employed to produce periodic impulses in a direct current supplied to the bath. It will also be obvious that a half wave rectifier, or any other suitable source of voltage having D.-C. and A.-C. components, could be used.

Figure 14:
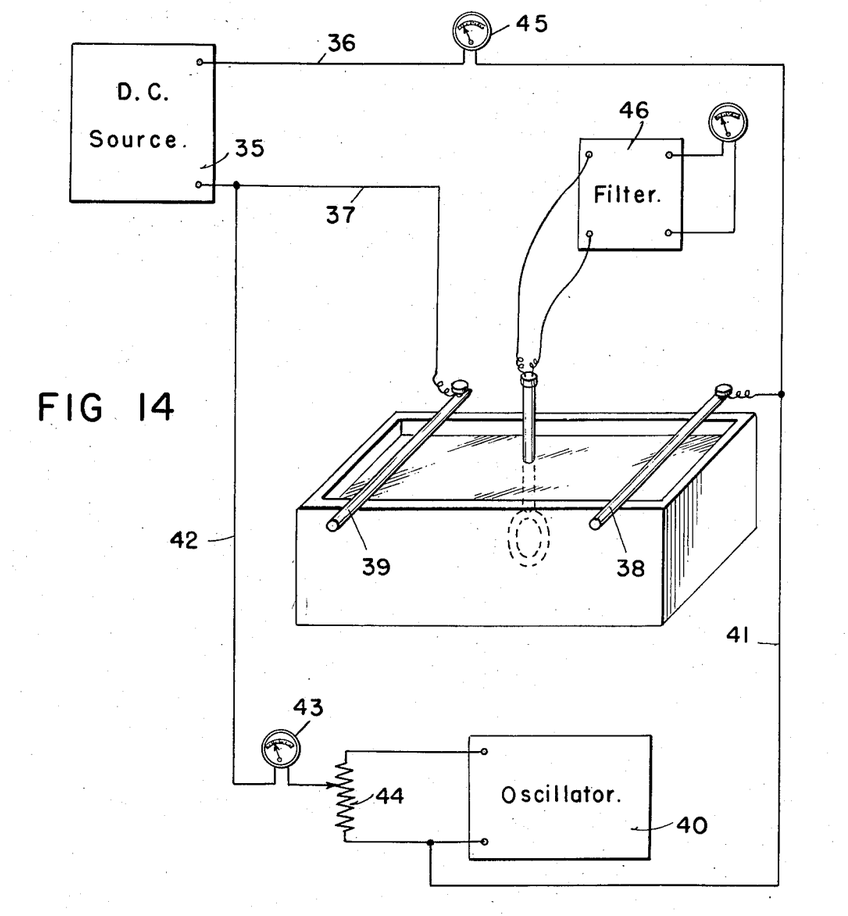

Fig. 14 discloses a further apparatus which can be used to supply an A.-C. component for use either with a pure D.-C. current, if such a pure current is to be used in connection with the bath, or a resultant current having an A.-C. component which it is not desired to use. In this figure, numeral 35 indicates a source of D.-C. voltage which is connected by means of conductors 36 and 37 to supporting rods 38 and 39 of the plating bath. A high frequency alternating current from an oscillator 40 is superimposed upon the direct plating current by means of conductors 41 and 42, also connected to the supporting rods 38 and 39. The magnitude of the superimposed periodic current from the oscillator must, of course, be strictly proportional to the main or direct current. That is to say, the proportionality between the A.-C. and the D.-C. components of the resultant or total current must be known whenever a measurement is to be taken, so that the value of the D.-C. component may be determined from the voltage across the coil. The may, if desired, be accomplished by hand, by supplying the periodic current through a meter 43, and controlling the magnitude by manually adjusting a suitable impedance 44, so as to keep a constant ratio between the readings of this meter and the meter 45 through which the main current is supplied.

Because of the undesirable space distribution characteristics of currents of extremely high frequency, the frequency of such a superimposed periodic current as supplied by oscillator 40 should not be greater than about 400 cycles per second. When using a superimposed current as described, it is possible to connect the coil to a tuned circuit, such as filter 46, responsive only to the particular frequency employed, so that, if periodic current components of any other frequency happen to be present in the bath, they will not be picked up. Moreover, this method has the advantage that the current superimposing apparatus and the core can be calibrated together and sold as a unit, which will give satisfactory results practically regardless of the nature of the main current supply.

While we have shown and described as preferable a pick-up coil uniformly wound on an annular core of magnetic material, thus constituting a true toroidal coil, the invention, in its broader aspects, is by no means limited to this specific arrangement.

Figure 5:
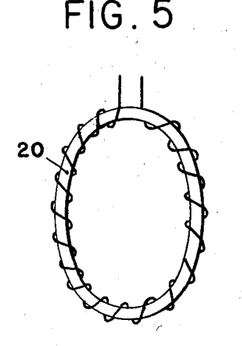
Figs. 5 to 13 inclusive are diagrammatic views, similar to Fig. 3, showing, by way of example, various modified forms of coil which may be employed; and, Fig. 14 is a schematic diagram of a modified form of voltage supply for the bath of Fig. 1.
Figure 6:
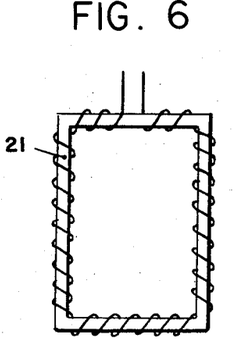
Figure 7:
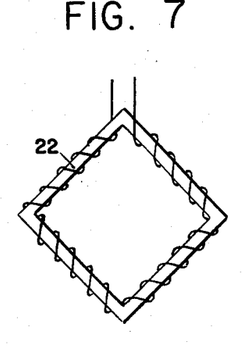
Figure 8:
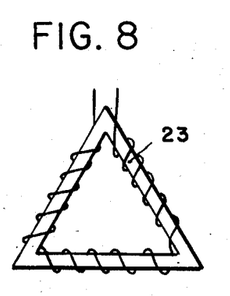
Figure 9:
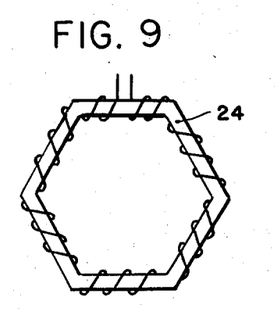

We find that satisfactory results can be obtained by using a ring-like core of many different shapes. By way of example, we have illustrated in Fig. 5 a core 20 of elliptical form, in Fig. 6 a rectangular core 21; in Fig. 7 a square or diamond-shaped core 22; in Fig. 8 a core 23 of triangular shape; and in Fig. 9 a hexangonal core 24. Thus, the core may be in the form of almost any regular or irregular polygon or of various curved shapes. All such geometrical forms may be designated as closed loops.

If one closed loop has a longer magnetic mean path than another for a given area of the loop, then the one with the longer path will be less efficient, and for a loop of the same cross-section, and for the same bath current through the area enclosed by the loop, the coil wound thereon, if of the same number of turns, will have a lower output than if wound on a loop having a shorter mean magnetic path.

Since a true ring or annulus has the shortest mean magnetic path of any closed loop, for a given area of loop, the same current flowing through the area enclosed by the loop will produce the greatest output in the coil. Hence a true ring or annulus is the preferred shape, as already stated.

While in all of the above-described modifications the winding is shown as substantially uniformly distributed around the core, such an arrangement is not essential. The desired results can also be obtained by employing a coil or winding concentrated on a part only of the core, as illustrated at 25 in Fig. 10. The core may be a true ring 14, or a loop of any of the other shapes above mentioned. The chief difference in effect between a concentrated winding of this kind and a uniformly distributed winding, as shown in the other figures, resides in the amount of pick-up from magnetic fields of the loop.

Figure 10:
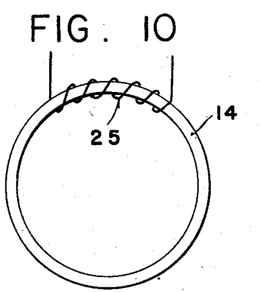

As already explained, a coil uniformly distributed around the core is substantially unaffected by any external magnetic field. A pick-up coil in the form of a winding which is non-uniformly distributed, or concentrated, as shown in Fig. 10, is subject to some extent to the influence of external fields, if not adequately shielded, and its output is thus not strictly proportional to the current flowing through the area enclosed by the ring or loop. Hence, with a non-uniformly distributed winding, a slight error may be caused by the presence of external magnetic fields whether due to currents through the bath or through other nearby conductors, and therefore such a winding, if unshielded, is not quite as accurate as is a uniformly distributed winding. Otherwise the principle is the same.

Methods of effectively shielding concentrated windings from the influence of external fields have been worked out, however, and if employed, such windings may be used satisfactorily.

Figure 11:
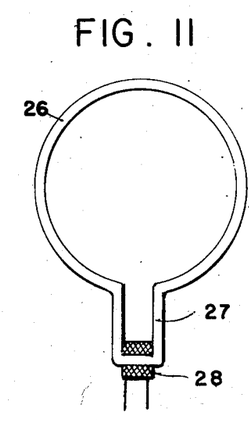

It is not even necessary for the coil to be wound on the main body of the ring-like core. In Fig. 11 we have illustrated a ring-shaped core 26 having a radially projecting U-shaped loop 27, around the end or bend of which loop a coil 28 is wound, the coil being confined between the arms of the loop. Pulsating flux is generated in the ring-shaped core 26 by the bath current flowing therethrough, and this same flux passes through the U-shaped loop on which the coil is wound, thus inducing an alternating voltage in the coil.

Figure 12:
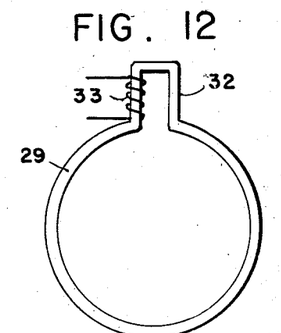

Again, it is not even necessary for the convolutions of such a concentrated winding to be disposed in radial planes, as illustrated in Figs. 10 and 11. For example, in Fig. 12 we have shown a ring-shaped core 29, having an off-set U-shaped loop 30, as in Fig. 11, but in Fig. 12 the coil 31 is wound upon one of the arms of the U-shaped loop. The convolutions of this coil in no sense lie in planes radial to the ring, and yet the same flux threads the coil as is generated in the ring, and the same voltage will be induced in the coil 31 as is induced in the coil 25 of Fig. 10, if the number of turns is the same, except for a slight decrease due to the fact that the magnetic circuit is slightly longer, and hence has a slightly greater reluctance.

Figure 13:
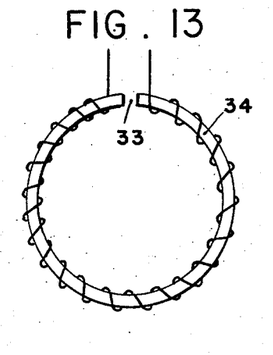

In all of the forms of the invention sofar discussed, the core has been shown as a closed loop, that is to say, as presenting a completely closed homogeneous magnetic path. But the core does not necessarily have to be homogeneous throughout. In Fig. 13, we have shown an annular core 34 having an air-gap 33. The presence of this air-gap results in reducing the net permeability of the magnetic path, and consequently somewhat reducing the efficiency of the pick-up action. However, if the coil wound on such a core with an air-gap is uniformly distributed as indicated in Fig. 13, the presence of the air-gap is relatively immaterial.

If an air-gap is present in a core having a concentrated winding such as illustrated in Fig. 10, it would reduce the magnitude of the flux through the core from that particular path, thus increasing the magnitude of the effective external pick-up relative to the internal pick-up, thereby introducing somewhat of an error.

To recapitulate, therefore, all forms of the invention illustrated, and many others, are capable of being usefully employed, whatever the shape of the core and whether continuous and homogeneous or not, and whether the winding of the coil is uniformly distributed or not, although, from a standpoint of efficiency and accuracy, some forms are to be preferred to others.

An apparatus has been disclosed herein which detects the voltage across a coil and thereby provides a measure of current density. As explained above, the invention is basic to that disclosed in Rezek application Serial No. 260,369, which discloses an apparatus for detecting the change in impedance across the coil. The term "response in said coil" has therefore been used to include both voltage across the coil and change in impedance of the coil, as well as equivalents thereof.

It will be understood from the above that the term "direct current" as used in the claims includes the current caused to flow in a load circuit by a rectifier, which current may consist of an A.-C. or harmonic component and a pure D.-C. component, and that the claims are not limited to use of a pure direct current having no such components.

We claim:

1. The combination with a liquid conducting medium having a pair of spaced electrodes therein and a direct current source connected to said electrodes to cause a direct current to flow through the medium from one of the electrodes to the other, of an apparatus responsive to the density of said direct current at a location in the medium, including a magnetic core of high permeability immersed in the medium defining a substantially closed path substantially enclosing a cross-sectional area which is small in comparison with the total cross-sectional area of the medium through which said current flows, said core being so located that the cross-sectional area it encloses is at an angle with respect to the direction of flow of said current, whereby one portion of said current flows through said cross-sectional area enclosed by the core in one direction and another portion of said current flows only outside of said last-mentioned cross-sectional area and in substantially the same direction, a coil wound on said core, only said one portion of the direct current producing a substantial response in said coil, whereby the response of said coil distinguishes between said one portion and said other portion of the direct current, and a detecting circuit for detecting said response connected to said coil to provide an output indicative of said one portion of the direct current to the exclusion of said other portion of the direct current.

2. The combination defined in claim 1 in which said detecting circuit includes a meter connected to said coil and calibrated in accordance with the magnitude of the cross-sectional area enclosed by the core in terms of direct current density.

3. The combination defined in claim 1 in which said coil is so wound on said core as to constitute substantially a true toroid.

4. The combination with a galvanic plating bath having an electrode and an object to be plated spaced apart in said bath and immersed in a conducting liquid, and a direct current source connected to said electrode and said object to cause a direct current to flow through the conducting liquid between the electrode and said object, of an apparatus responsive to the density of said direct current at a location in the bath, including a magnetic core of high permeability immersed in the conducting liquid defining a substantially closed path substantially enclosing a cross-sectional area which is small in comparison with the total cross-sectional area of the bath through which said current flows, said core being so located that the cross-sectional area it encloses is at an angle with respect to the direction of flow of said current, whereby one portion of said current flows through said cross-sectional area enclosed by the core in one direction and another portion of said current flows only outside of said last-mentioned cross-sectional area and in substantially the same direction, a coil wound on said core, only said one portion of the direct current producing a substantial response in said coil, whereby the response of said coil distinguishes between said one portion and said other portion of the direct current; and a detecting circuit for detecting said response connected to said coil to provide an output indicative of said one portion of the direct current to the exclusion of said other portion of the direct current.

5. The combination with a galvanic plating bath having an electrode and an object to be plated spaced apart in said bath and immersed in a conducting liquid, and a direct current source connected to said electrode and said object to cause a direct current to flow through the conducting liquid between the electrode and the object, of an apparatus for measuring the density of said direct current at a location in the bath, including a magnetic core of high permeability immersed in the conducting liquid defining a substantially closed path substantially enclosing a cross-sectional area which is small in comparison with the total cross-sectional area of the bath through which the current flows, said core being so located that the cross-sectional area it encloses is at an angle with respect to the direction of flow of said current, whereby one portion of said current flows through said cross-sectional area enclosed by the core in one direction and another portion of said current flows only outside of said last-mentioned cross-sectional area and in substantially the same direction, a coil wound on said core, said core being of so much higher permeability than said conducting liquid that the magnitude of the linking flux following said substantially closed path is very much greater than the magnitude of the linking flux following any other path, and means for detecting the magnitude of the linking flux following said substantially closed path connected in closed circuit with said coil to provide an output indicative of said one portion of the direct current to the exclusion of said other portion of the direct current.

6. The combination with a liquid conducting medium having a pair of spaced electrodes therein and a source of unidirectional current having an A.-C. and a D.-C. component connected to said electrodes to cause said unidirectional current to flow through the medium from one of the electrodes to the other, said D.-C. component having a known proportionality to said A.-C. component, of an apparatus for yielding a response indicative of the density of said D.-C. component of the current at a location in the medium, including a magnetic core of high permeability immersed in the medium defining a substantially closed path substantially enclosing a cross-sectional area of the medium through which said current flows, said core being so locatable that the cross-sectional area it encloses is at an angle with respect to the direction of flow of said current, whereby one portion of said current flows through said cross-sectional area enclosed by the core in one direction and another portion of said current flows only outside of said last-mentioned cross-sectional area and in substantially the same direction, a coil wound on said core, whereby said coil is linked by flux generated by the A.-C. component of said one portion of the current, and a detecting circuit for detecting the voltage across said coil connected to said coil.

7. The combination defined in claim 6 in which said coil is so wound on said core as to constitute substantially a true toroid, and said core is movable to any desired location in said bath.

8. The combination with a galvanic plating bath having an electrode and an object to be plated spaced apart in said bath and immersed in a conducting liquid, and a source of unidirectional current having an A.-C. and a D.-C. component connected to said electrode and said object to cause said unidirectional current to flow through the conducting liquid between the electrode and said object, said D.-C. component having a known proportionality to said A.-C. component, of an apparatus for yielding a response indicative of the density of said D.-C. component of the current at a location in the bath, including a magnetic core of high permeability immersed in the conducting liquid defining a substantially closed path substantially enclosing a cross-sectional area which is small in comparison with the total cross-sectional area of the bath through which said current flows, said core being so locatable that the cross-sectional area it encloses is at an angle with respect to the direction of flow of said current, whereby one portion of said current flows through said cross-sectional area enclosed by the core in one direction and another portion of said current flows only outside of said last-mentioned cross-sectional area and in substantially the same direction, a coil wound on said core, said core being of so much higher permeability than said conducting liquid that the voltage induced in said coil by linking flux following said substantially closed path is of very much greater magnitude than the voltage induced in said coil by linking flux following any other path, both said linking fluxes being caused by the A.-C. component of said current, whereby the voltage across said coil is substantially a measure only of the magnitude of the A.-C. component of said one portion of the current, and a meter connected in a closed circuit with said coil, said meter being calibrated in accordance with the known proportionality between the A.-C. and D.-C components of said current to yield an indication of density of said D.-C. component.

9. The combination defined in claim 8 in which said source of unidirectional current includes a bridge rectifier having its input connected to a source of alternating current and having its output connected across the combination of said electrode and said object.

10. The combination defined in claim 9 in which said coil is so wound on said core as to constitute substantially a true toroid, and said core is movable to any desired location in said bath.

11. The combination with a liquid conducting medium having a pair of spaced electrodes therein and a source of direct current connected to said electrodes to cause a direct current to flow through the medium from one of the electrodes to the other, of an apparatus responsive to the density of said direct current at a location in the medium including means for superimposing on said direct current an alternating current component having a known proportionality to the direct current, said direct current and said alternating current component forming a resultant current, a magnetic core of high permeability immersed in the medium defining a substantially closed path substantially enclosing a cross-sectional area which is small in comparison with the total cross-sectional area through which said resultant current flows, said core being so locatable that the cross-sectional area it encloses is at an angle with respect to the direction of flow of said resultant current, whereby one portion of said resultant current flows through said cross-sectional area in one direction and another portion of said resultant current flows only outside of said cross-sectional area and in substantially the same direction, a coil wound on said core in which a voltage having a magnitude indicative of the magnitude of the alternating current component of said one portion of the resultant current is induced, and a detecting circuit connected to said coil responsive to said voltage induced in the coil.

12. The combination with a galvanic plating bath having an electrode and an object to be plated spaced apart in said bath and immersed in a conducting liquid, and a source of direct current connected to said electrode and said object to cause a direct current to flow through the conducting liquid between the electrode and said object, of an apparatus for measuring the density of said direct current at a location in the medium, including means for superimposing on said direct current an alternating current component having a known proportionality to the direct current, said direct current and said alternating current component forming a resultant current, a magnetic core of high permeability immersed in the conducting liquid defining a substantially closed path substantially enclosing a cross-sectional area which is small in comparison with the total cross-sectional area through which said resultant current flows, said core being so locatable that the cross-sectional area it encloses is at an angle with respect to the direction of flow of said resultant current, whereby one portion of said resultant current flows through said cross-sectional area enclosed by the core in one direction and another portion of said resultant current flows only outside said last-mentioned cross-sectional area and in substantially the same direction, a coil wound on said core, said core being of so much higher permeability than said conducting liquid that the voltage induced in said coil by linking flux following said substantially closed path is of very much greater magnitude than the voltage induced in said coil by linking flux following any other path, both said linking fluxes being caused by the A.-C. component of said current, whereby the voltage across said coil is substantially a measure only of the magnitude of the A.-C. component of said one portion of the current, and a detecting circuit including a meter connected in a closed circuit with said coil, said meter being calibrated in accordance with the known proportionality between the A.-C. component and said direct current to yield an indication of density of said direct current.

13. The apparatus defined in claim 12 in which said alternating component is of predetermined frequency, and said detecting circuit includes a filter designed to discriminate against voltages of other than said predetermined frequency, said filter being connected between said coil and said meter.

References Cited in the file of this patent

UNITED STATES PATENTS

| | | |
|---|---|---|
| 1,735,878 | Pfanhauser | Nov. 19, 1929 |
| 2,542,057 | Relis | Feb. 20, 1951 |